United States Patent
Jalabert

(10) Patent No.: US 10,903,698 B2
(45) Date of Patent: Jan. 26, 2021

(54) STATOR MAGNETIC SHEET, ASSOCIATED METHOD AND ROTATING ELECTRICAL MACHINE

(71) Applicant: GE Energy Power Conversion Technology Limited, Rugby (GB)

(72) Inventor: Sylvain Jalabert, Grand-Est (FR)

(73) Assignee: GE Energy Power Conversion Technology Limited, Warwickshire (GB)

( * ) Notice: Subject to any disclaimer, the term of this patent is extended or adjusted under 35 U.S.C. 154(b) by 0 days.

(21) Appl. No.: 16/288,232

(22) Filed: Feb. 28, 2019

(65) Prior Publication Data
US 2019/0267853 A1    Aug. 29, 2019

(30) Foreign Application Priority Data
Feb. 28, 2018    (FR) ...................... 18 51759

(51) Int. Cl.
*H02K 1/12*    (2006.01)
*H02K 15/02*    (2006.01)
*H02K 1/18*    (2006.01)

(52) U.S. Cl.
CPC .............. *H02K 1/12* (2013.01); *H02K 1/185* (2013.01); *H02K 15/02* (2013.01)

(58) Field of Classification Search
CPC ........... H02K 1/33; H02K 1/185; H02K 15/14
USPC .... 310/216.001, 216.004, 216.049, 216.084, 310/216.089
See application file for complete search history.

(56) References Cited

U.S. PATENT DOCUMENTS

| | | | | |
|---|---|---|---|---|
| 1,795,882 A | * | 3/1931 | Noden | H02K 1/185 310/433 |
| 2,818,515 A | * | 12/1957 | Dolenc | H02K 1/185 310/57 |
| 2006/0279160 A1 | | 12/2006 | Yoshinaga et al. | |
| 2013/0002086 A1 | * | 1/2013 | Kaiser | H02K 1/16 310/216.009 |

FOREIGN PATENT DOCUMENTS

| | | | |
|---|---|---|---|
| EP | 0793332 A1 | 9/1997 | |
| GB | 1092864 A | * 11/1967 | ............... H02K 1/16 |
| GB | 1092864 A | 11/1967 | |
| WO | 2008067706 A1 | 6/2008 | |

OTHER PUBLICATIONS

French Search Report and Written Opinion dated Oct. 15, 2018 which was filed in connection with FR1851759 which was filed on Feb. 28, 2018.

* cited by examiner

*Primary Examiner* — Jose A Gonzalez Quinones
(74) *Attorney, Agent, or Firm* — Wood IP LLC

(57) ABSTRACT

A subsea assembly comprising an electric subsea machine having an electric motor driving an operator, and a coolant circuit at least partially located in thermal contact with the electric motor, the coolant circuit including a cooling assembly located externally from the subsea machine, the cooling assembly comprising at least a heat transfer element, the subsea machine and the cooling assembly being supported by a common supporting frame; at least a part of the heat transfer element is integrated in the frame.

14 Claims, 4 Drawing Sheets

STATOR MAGNETIC SHEET, ASSOCIATED METHOD AND ROTATING ELECTRICAL MACHINE

FIELD OF THE DISCLOSURE

This invention relates to a magnetic sheet for a stator of a rotating electrical machine. This invention also relates to a rotating electrical machine comprising such a magnetic sheet and a method of manufacturing such a magnetic sheet.

BACKGROUND

A rotating electrical machine has a stator in which is inserted a rotor, and it can weigh several tens of tons. For example, a 2-pole rotating electrical machine developing 37 MW weighs 46 tons.

Depending on the application in which the rotating electrical machine is used, its mass may be greater than the maximum permissible mass.

In addition, for a large mass rotating electrical machine, the handling operations are more complicated to implement, including the transport of the machine that may require an exceptional road convoy.

It is therefore necessary to reduce the mass of the machine.

One method of reducing the mass of the machine would be to lighten the rotor or stator by creating them from materials of lower density, e.g. by replacing copper by aluminum in the stator and rotor windings.

However, for reasons related to the mechanical, thermal and electrical properties of the materials, it is not possible to replace the materials normally used.

Another method of reducing the mass of the machine would be to reduce the volume of material incorporated into the rotor.

However, the electrical characteristics of the rotating electrical machine are directly proportional to the volume of cuprous and ferrous materials incorporated into the rotor.

It would also be possible to reduce the material volume of the stator.

The stator of a rotating electrical machine may comprise a stack of magnetic sheets of substantially circular shape held together by tie rods or bars. The tie rods or bars compact and hold the magnetic sheets. The stator magnetic sheets have a recess in their center intended to hold a rotor.

FIG. 1 shows an example of a laminated stator 1 of an electrical machine known from the prior art comprising an axis of revolution (A).

The stator has a mass of e.g. 25 tons and an external diameter of 2 meters. The stack of magnetic plates in the stator weighs 19 tons.

The stator 1 comprises packets of magnetic sheets 2 compacted between two clamping plates 3 arranged on either side of the stator and connected by tie rods 4.

The plates 3 and the tie rods 4 forming the frame of the stator hold the packets of compacted sheets.

FIG. 2 shows a portion of a magnetic sheet 2 according to the prior art.

The magnetic sheet comprises a yoke 5 and teeth 6.

The yoke 5 comprises holes 7 intended to accommodate the tie rods 4 and a sheet zone 8 located between the teeth 6 and the holes 7.

The teeth 6 form notches intended to accommodate the stator windings generating a magnetic field.

The torque developed by the rotating electrical machine is directly proportional to the magnetic flux generated by the windings circulating in the zone 8 of the sheet 2.

In other words, the surface 8 of the sheet located between the holes 7 and the teeth 6 is dimensioned such that the electrical and mechanical characteristics of a rotating electrical machine incorporating the magnetic sheet 2 are optimal.

BRIEF SUMMARY

It is therefore proposed to overcome the disadvantages associated with the methods of reducing the mass of a rotating electrical machine according to the prior art.

In view of the above, a stator magnetic sheet is provided for a rotary electrical machine comprising a yoke comprising a fixation zone configured to fix the sheet in the stator of the rotating electrical machine and located on an external periphery of the sheet and comprising openings intended to accommodate connecting means configured to hold the stator magnetic sheet in the stator.

The fixation zone comprises indentations configured such that each of the openings is surrounded by a cord of sheet with a width greater than or equal to a minimum value.

The openings are distributed uniformly over the external periphery.

The openings comprise indented circular holes.

According to one embodiment, the openings comprise rectangular, square or elliptical holes.

According to another aspect, a stator for a rotating electrical machine is provided comprising connecting means configured to maintain a plurality of stator magnetic sheets as defined above.

The connecting means comprise tie rods with a circular section and the openings comprise indented circular holes.

According to one embodiment, the connecting means comprise bars with a rectangular section and the openings comprise rectangular holes.

The magnetic sheets are circular.

According to yet another aspect, a rotating electrical machine is proposed comprising a stator as defined above.

A method is further proposed for producing a stator magnetic sheet is provided for a rotary electrical machine comprising a yoke comprising a fixation zone configured to fix the sheet in the stator of the rotating electrical machine and located on an external periphery of the sheet and comprising openings intended to accommodate connecting means configured to hold the stator magnetic sheet in the stator.

The fixation zone is indented such that each of the openings is surrounded by a cord of sheet with a width greater than or equal to a minimum value.

The openings are distributed uniformly over the external periphery.

The openings of an indented circular shape are made.

According to yet another aspect, a method is provided for producing a stator comprising a plurality of stator magnetic sheets as defined above.

BRIEF DESCRIPTION OF THE DRAWINGS

Other characteristics of the invention will become apparent on reading the following description of the embodiments of the invention, given solely by way of nonlimiting examples, with reference to the drawings, in which.

DETAILED DESCRIPTION

Figure 1:
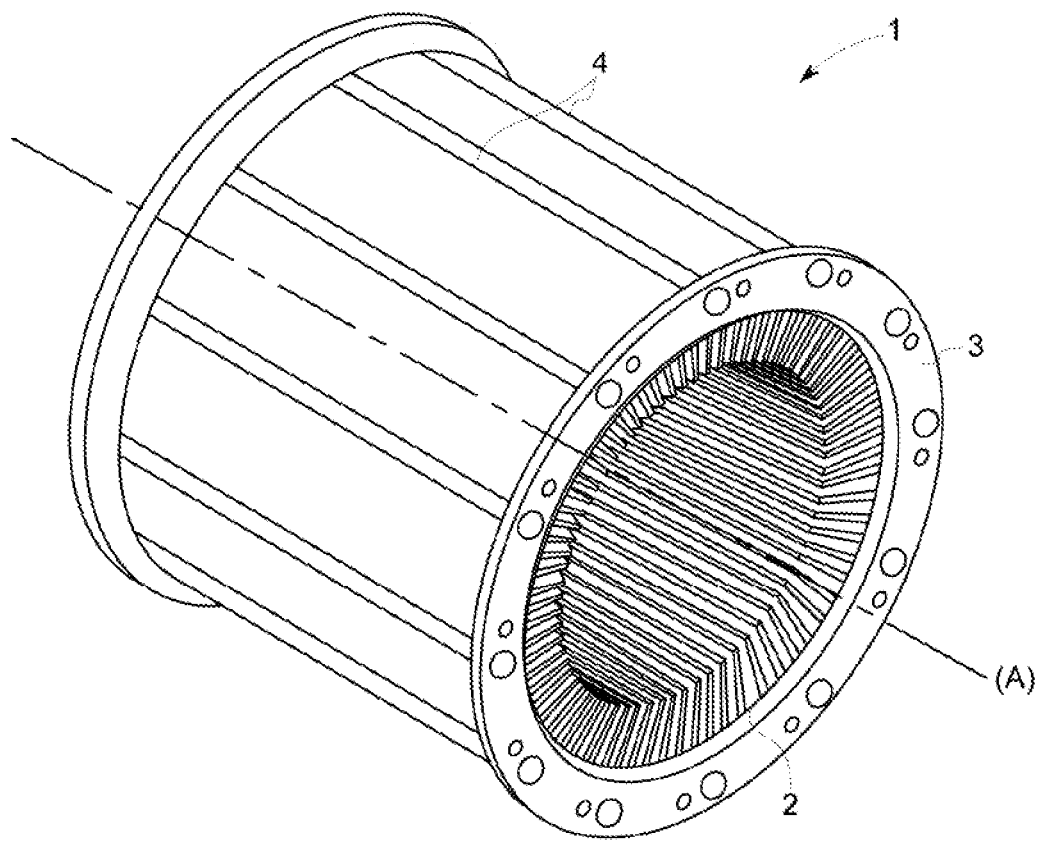
FIGS. 1 and 2, as have already been mentioned, illustrate respectively a stator and a stator magnetic sheet according to the prior art.
Figure 2:
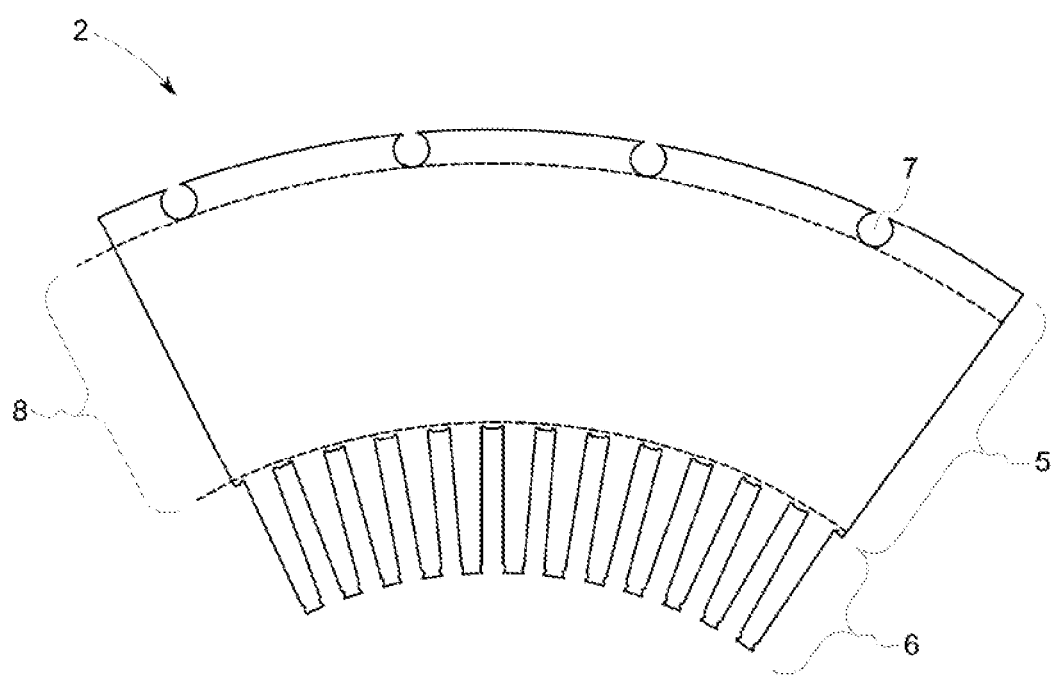
Figure 3:
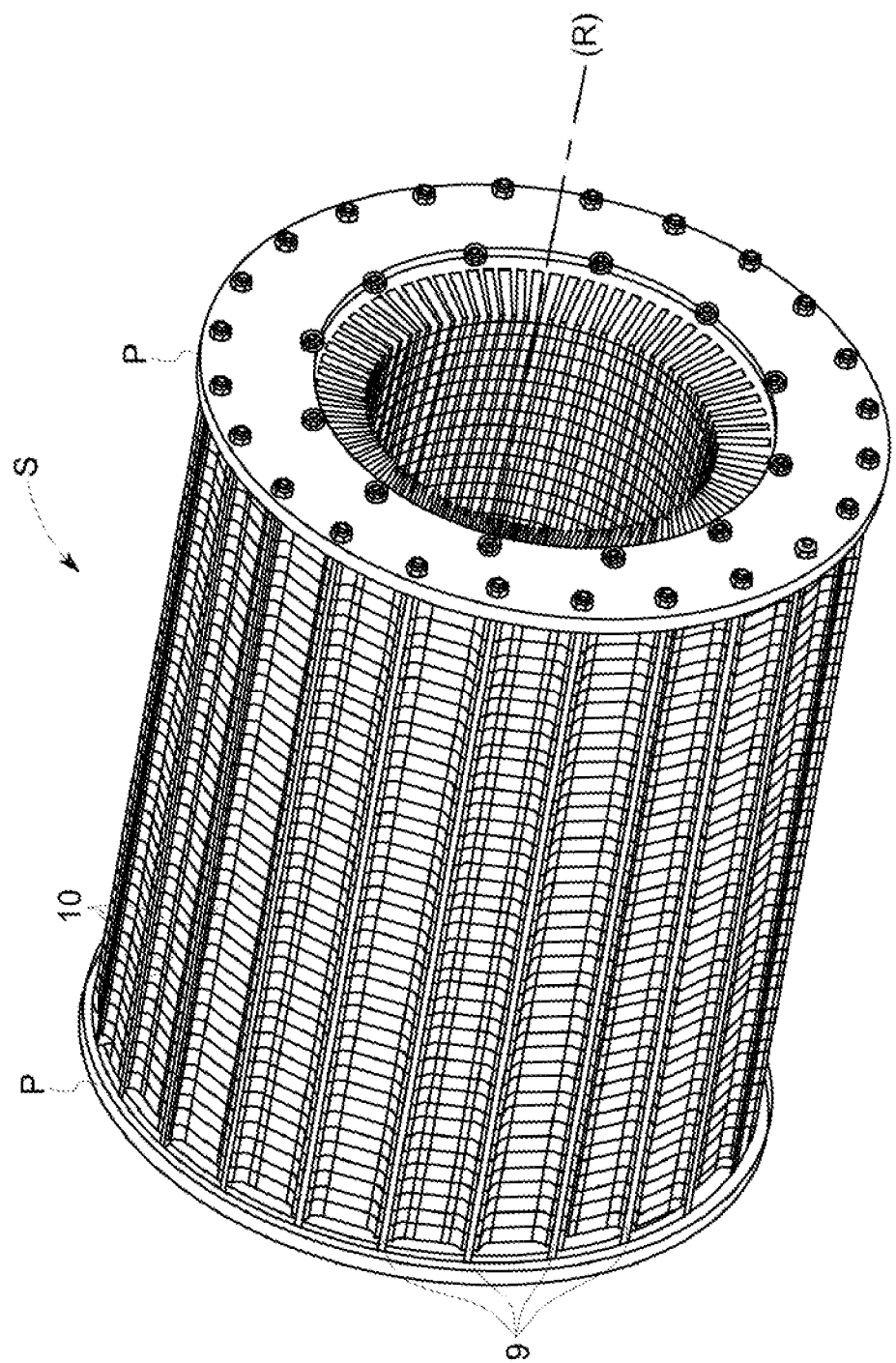
FIG. 3 illustrates an embodiment of a stator of a rotating electrical machine.

Reference is made to FIG. 3 which illustrates an embodiment of a stator S of a rotating electrical machine.

The stator S comprises a cylindrical metal structure, tie rods 9 with a circular section and stacks of annular compacted magnetic sheets 10. It further comprises electrical stator windings (not shown), which are intended to be connected to a control device (not shown).

Although here the magnetic sheets 10 have a circular shape, according to another embodiment the magnetic sheets may be of any shape, e.g. square, comprising a circular central recess intended to accommodate a rotor of the rotating electrical machine.

The axis of rotation of the cylindrical metallic structure is represented by the axis (R).

The metal structure comprises two clamping plates P and connection means here comprising tie rods 9.

The magnetic sheets 10 are compacted axially between the two clamping plates P connected to each other by the connecting means.

The metal structure thus ensures the compaction and contributes to the rigidity of the stator.

The connecting means are fixed to the clamping plates e.g. by welding or screwing.

In addition, the connecting means pass through the sheets 10 such as to hold the magnetic sheets 10 in the stator S.

Although here the connecting means connect the clamping plates and hold the plates 10 in the stator, according to another embodiment first connecting means connect the clamping plates and second connecting means hold the magnetic sheets 10 in the stator S.

The rotor of the rotating electrical machine is inserted in the center of the metallic structure such that the axis of rotation of the rotor coincides substantially with the axis (R).

The magnetic sheets 10 are grouped into packets of sheets that can be separated from each other by spacers arranged between them to create a ventilation duct between the packets of magnetic sheets 10.

Figure 4:
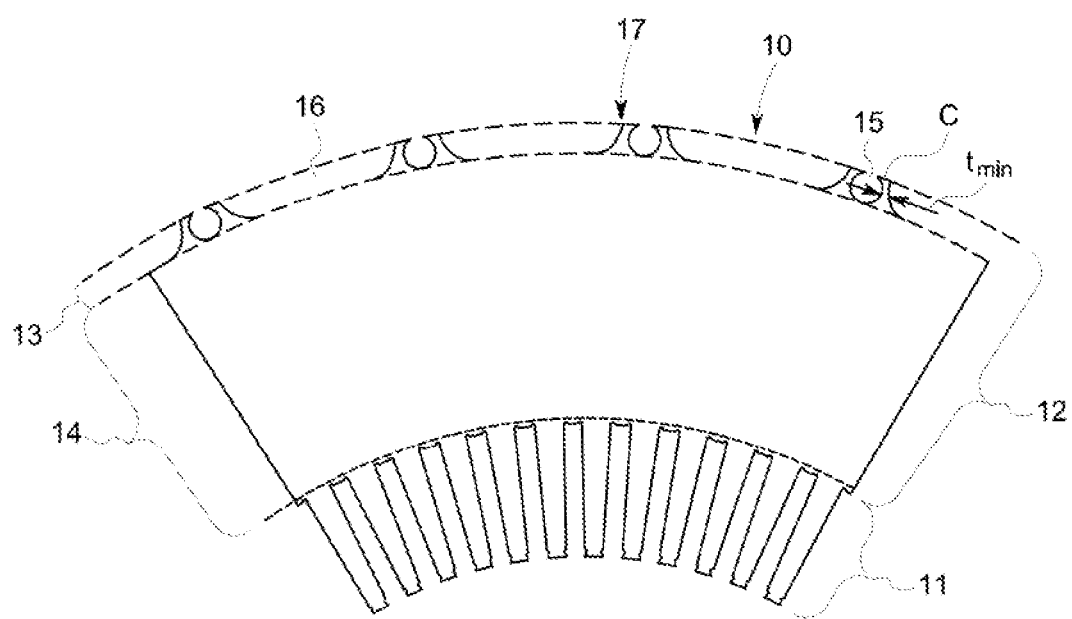
FIG. 4 illustrates an embodiment of a portion of a stator magnetic sheet.

Reference is made to FIG. 4 which illustrates a portion of a stator magnetic sheet 10.

The sheet 10 comprises teeth 11 and a yoke 12.

The yoke 12 is located on the external periphery of the sheet 10 and extends as far as the teeth 11 located on the internal periphery of the sheet. The teeth 11 form notches intended to accommodate the electrical stator windings.

The yoke 12 comprises a fixation zone 13 located on the external periphery of the stator magnetic sheet, which serves to fix the sheet 10 in the stator S, and a magnetic flux channeling zone 14 located between the teeth 11 and the fixation zone 13.

The torque delivered by a rotating electrical machine incorporating the stator S is proportional to the magnetic flux generated by the stator electrical windings circulating in the channeling zone 14.

The magnetic flux channeling zone 14 is dimensioned such that the rotating electrical machine incorporating the stator S provides the desired torque.

The fixation zone 13 comprises openings 15 configured to accommodate the connecting means and indentations 16 configured such that each of the openings 15 is surrounded by a sheet cord C with a width greater than or equal to a minimum value $t_{min}$.

The indentations 16 make it possible to remove material from the sheet 10 without compromising the rigidity of the sheet 10 and ensuring the fixation of the sheet in the stator S.

As a result, the indentations 16 make it possible to reduce the mass of the sheet 10.

An opening 15 surrounded by a sheet cord C forms a fixation lug 17.

The value $t_{min}$ of the width of the cord C is determined such that the rigidity of the fixation lug 17 is sufficient to hold and compact the stator magnetic sheets in the stator STAT and the torque transfer.

The width of the cord C is greater than the value $t_{min}$.

The openings 15 are uniformly distributed over the external periphery of the sheet as shown here or distributed unevenly over the sheet.

As shown here, the connecting means comprise tie rods 9 with a circular section, and therefore the openings 15 of the fixation lugs 17 have a circular shape.

According to another embodiment, the connecting means comprise bars with a rectangular section. The openings 15 are configured to accommodate the bars, i.e. the openings 15 are rectangular.

Although two embodiments of the connecting means of rectangular and circular section have been described, any section shape, e.g. an elliptical or square section, is conceivable.

The indentations 16 are made e.g. by laser cutting, stamping or any method known to those skilled in the art.

In other words, the fixation zone 14 is indented such that each of the openings 15 is surrounded by a sheet cord C whose width is greater than or equal to a minimum value $t_{min}$.

The openings 15 in the lugs 17 are made e.g. by punching, laser cutting or any method known to those skilled in the art.

The lugs 17 may be indented as shown here to facilitate the ejection of the cutting residue in the case of obtaining the openings 15 by punching or so as to optimize the trajectory of a laser cutting head.

The indentations 16 make it possible to lighten the mass of the stator magnetic sheets.

For example, for a stator weighing 25 tons and comprising a set of stator magnetic sheets weighing 19 tons, the indentations 16 make it possible to lighten the stator by 1.5 tons while preserving the magnetic properties of the stator, i.e. a lightening of the stator plates of 8%.

The indentations 16 make it possible to remove material from the stator S without modifying the magnetic flux channeling zone. The mass of the stator S is lightened while preserving the magnetic characteristics of the stator.

Therefore, the electrical characteristics of the rotating electrical machine incorporating the stator S are preserved.

The invention claimed is:

1. A stator magnetic sheet for a rotary electrical machine comprising:
   a plurality of teeth extending from an internal periphery of the stator magnetic sheet; and
   a yoke comprising a fixation zone configured to fix the static magnetic sheet in a stator of the rotating electrical machine and located on an external periphery of the sheet and the fixation zone including:

a plurality of openings along the external periphery of the stator magnetic sheet to accommodate connecting means configured to hold the stator magnetic sheet in the stator, and a plurality of indentations formed along the external periphery of the stator magnetic sheet and having a same depth as that of the plurality of openings wherein each opening of the plurality of openings being formed between a pair of indentations of the plurality of indentations, and a sheet cord surrounding each opening being formed by the pair of indentations wherein the sheet cord comprises a width equal to a minimum value which is less than a width of each opening.

2. The stator magnetic sheet according to claim 1, wherein the openings are uniformly distributed over the external periphery.

3. The stator magnetic sheet according to claim 1, wherein the openings comprise indented circular holes.

4. The stator magnetic sheet according to claim 1, wherein the openings comprise rectangular, square or elliptical holes.

5. The stator magnetic sheet according to claim 1 having a circular shape.

6. A stator for a rotary electrical machine comprising:
a connecting means configured to hold a plurality of stator magnetic sheets in the stator, each magnetic sheet comprising a plurality of teeth extending from an internal periphery of the stator magnetic sheet and a yoke comprising a fixation zone configured to fix the sheet in the stator and located on an external periphery of the sheet and the fixation zone including:
a plurality of openings formed along the external periphery of each stator magnetic sheet configured to accommodate the connecting means,
a plurality of indentations formed along the external periphery of each stator magnetic sheet and having a same depth as that of the plurality of openings wherein each opening of the plurality of openings is formed between a pair of indentations of the plurality of indentations, and
a sheet cord surrounding each opening being formed by the pair of indentations wherein the sheet cord comprises a width equal to a minimum value which is less than a width of each opening.

7. The stator according to claim 6, wherein the connecting means comprise tie rods with a circular section and the openings comprise indented circular holes.

8. The stator according to claim 6, wherein the connecting means comprise bars with a rectangular section and the openings comprise rectangular holes.

9. The stator according to claim 6, wherein the magnetic sheet is circular.

10. A rotating electrical machine comprising a stator according to claim 6.

11. A method of producing a stator magnetic sheet for a rotary electrical machine comprising a plurality of teeth extending from an internal periphery of the stator magnetic sheet, and a yoke comprising a fixation zone configured to fix the sheet in the stator of the rotating electrical machine and located on an external periphery of the sheet, the method comprising:
forming within the fixation zone a plurality of openings along the external periphery of the stator magnetic sheet to accommodate connection means configured to hold the stator magnetic sheet in the stator;
forming a plurality of indentations along the external periphery of the stator magnetic sheet, the plurality of indentations having a same depth as that of the plurality of openings, wherein each opening of the plurality of openings is formed between a pair of indentations of the plurality of indentations; and
forming, via the pair of indentations, a sheet cord surrounding each opening wherein the sheet cord comprises a width equal to a minimum value which is less than a width of each opening.

12. The method of producing a stator magnetic sheet according to claim 11, wherein the openings are distributed uniformly over the external periphery.

13. The method of producing a stator magnetic sheet according to claim 11, wherein openings of an indented circular shape are produced.

14. The method of producing a stator comprising a plurality of stator magnetic sheets, wherein the stator magnetic sheets are produced according to claim 11.

* * * * *